United States Patent [19]

Blount

[11] 4,086,190
[45] Apr. 25, 1978

[54] PROCESS FOR THE PRODUCTION OF SILICIC EPOXY POLYMERS

[76] Inventor: David H. Blount, 5450 Lea St., San Diego, Calif. 92105

[21] Appl. No.: 752,425

[22] Filed: Dec. 20, 1976

Related U.S. Application Data

[63] Continuation-in-part of Ser. No. 678,196, Apr. 19, 1976, which is a continuation-in-part of Ser. No. 612,844, Sep. 12, 1975, abandoned, which is a continuation-in-part of Ser. No. 262,485, Jun. 14, 1972, abandoned.

[51] Int. Cl.$^2$ ............................................. C08F 283/12
[52] U.S. Cl. .............................. 260/2 S; 106/287.1; 260/2 EP; 260/2 EC; 260/2 BP; 260/47 EP; 260/47 EC; 260/78 S; 260/78 SC; 260/404; 260/79; 423/324; 423/325; 423/326
[58] Field of Search .................. 423/324, 325, 326; 106/287 S; 260/2 S, 2 EP, 2 EC, 2 BP, 47 EP, 47 EC, 78 S, 78 SC, 404, 79

[56] References Cited
U.S. PATENT DOCUMENTS 4,036,787  7/1977  Blount .................................. 260/2 S Primary Examiner—Melvyn I. Marquis

[57] ABSTRACT

A mixture containing silicoformic acid and hydrated silica and epoxy compounds are reacted to produce epoxy silicoformate and silicate compounds and polymers, when mixed together in the presence of a suitable catalyst.

15 Claims, No Drawings

PROCESS FOR THE PRODUCTION OF SILICIC EPOXY POLYMERS

CROSS-REFERENCE TO RELATED APPLICATIONS

This Application is a continuation-in-part of my copending U.S. patent application Ser. No. 678,196, filed Apr. 19, 1976 which is a continuation-in-part of my earlier U.S. Patent application Ser. No. 612,844, filed Sept. 12, 1975, now abandoned which is a continuation-in-part of my earlier U.S. patent application Ser. No. 262,485, filed June 14, 1972, now abandoned.

BACKGROUND OF THE INVENTION

This invention relates to the production of a mixture of silicoformic epoxy and silicic epoxy polymers which will be referred to as silicic epoxy polymers for the purposes of this Application.

Silicoformic acid and hydrated silica used in this process may be produced by chemically reacting a dry granular alkali metal metasilicate with a concentrated mineral acid or a hydrogen containing salt, as disclosed in my U.S. Pat. Nos. 3,993,737, filed by David H. Blount. Silicoformic acid may be produced by other methods as those disclosed in U.S. Pat. Nos. 3,674,430 and 3,937,782.

The silicoformic acid as produced in my U.S. Pat. Nos. 3,956,466 and 3,962,111 and which was used in this invention, was analyzed. It was found to contain mainly silicoformic acid (H.SiO.OH) and hydrated silica (SiO$_2$.xH$_2$O). I know of no method to separate the two; both are a white granular compound. The silicoformic acid contains Si—H bonds.

The said silicoformic acid was analyzed by Infrared Analysis, using the Infrared KBr disc method. It was found to be similar in nature to the Mallinckrodt's hydrated silica, SiO$_2$.xH$_2$O, except for the presence of Si—H bonds which gave a definite absorption peak at 615 cm$^{-1}$. This is attributable to one of the varieties of Si—H bonding characteristics, as found and identified in Beckman Instruments Far IR Vibrational Frequency Correlation Chart. The Mallinckrodt's hydrated silica has a molecular weight of 60.09xH$_2$O. An aqueous suspension of the silicoformic acid will reduce an aqueous silver nitrate solution which gives further evidence that Si—H bonds are present.

The silicoformic acid was analyzed but using hydroflouric acid to remove the silicon dioxide, and the dry compound contained about 90% silicon dioxide, 5% water and 5% salt. The compound has a high melting point estimated at 1650° C. The melted sample fuses into a glass-like material, clear in appearance.

The silicoformic acid and hydrated silica mixture is not soluble in any common organic solvents but is readily soluble in dilute alkali metal hydroxide aqueous and polyol solutions.

The molecular weight was determined by the boiling point elevation of a 6N NaOH solution and indicated a molecular weight of 78 ± 25 gm/mol. This type of reactive solution normally changes the molecular species. However, this would indicate the absence of a polymeric form of silicate. It may indicate a possible formula of H$_4$SiO$_3$ (orthosilicoformic acid) and H$_3$SiO$_3$ (metasilicic acid).

The silicoformic acid compound has the chemical properties of an acid and rapidly reacts with alkali compounds. The silicoformic acid compound is an acid, has Si—H bonds and is similar to hydrated silica in molecular weight; therefore, it has a chemical formula of H.SiO.OH.xH$_2$O.

The silica hydrate mixed in with the silicoformic acid will also react with epoxy compounds to produce epoxy silicate polymers.

While a wide variety of epoxy compounds and polymers have been produced for a number of diverse applications, none have the unique properties possessed by the compounds of this invention. Epoxy silicoformate polymers and epoxy silicate polymers may be used as molding materials, as coating agents, in dispersions, as adhesives, as fillers, in casting applications, as prepolymers, as impregnates, in rubber-like materials and may be copolymerized with other reactants. They may also be used as intermediates in the production of further compounds.

SUMMARY OF THE INVENTION

I have discovered that silicoformic acid and hydrated silica, when mixed in appropriate proportions with a suitable epoxy compound and suitable catalyst, will react chemically to produce an epoxy silicoformate polymer and an epoxy silicate polymer. This basic process may be varied to produce products having varied properties. The proportions of the silicoformic acid and hydrated silica mixture to catalyst and epoxy compound may be varied, for example, to produce a polymer ranging from very hard, to soft and rubbery.

The reactants may be mixed in any suitable proportions, depending upon the product characteristics desired. Generally, from about 0.1 to about 3 mols of the epoxy compound are mixed with each mol of silicoformic acid and hydrated silica. A catalytically effective amount of the selected catalyst is used. Generally, depending upon the catalyst selected and the reaction conditions desired, where the catalyst, such as some amines, also enters into the reaction, a larger quantity of a catalyst may be desirable. In most cases from about 0.02 to 2 parts catalyst per part of the silicoformic acid and hydrated silica mixture will give good results.

In the preferred embodiment of this invention, a thermoplastic polymer having excellent properties is produced by mixing the silicoformic acid and hydrated silica mixture and a suitable amine catalyst, then adding the epoxy compound in steps of about 10 to 20 percent of the total, allowing the reaction to be completed for each step before additional epoxy compound is added. Generally, with agitation, only a few minutes need be allowed between addition of steps.

Any suitable epoxy compound may be used in this process. Typical epoxy compounds include epichlorohydrin, glycidol, methyl epichlorohydrin, 1,2-epoxy-3-phenoxypropane, 3,4-epoxyethyl benzene, 1,8-epoxy-o-menthane, 1,2-epoxybutane, 1,2-epoxycyclohexane, epoxyethane, 1,2-epoxypropane, 1-chloro-2,3-epoxypropane, 1:2,3:4-diepoxybutane, 2:3,6:7-diepoxy-2,6-dimethyl-4-octene, epoxyethylbenzene and mixtures thereof. Of these, best results are obtained with epichlorohydrin, which is therefore, the preferred epoxy compound.

In an alternative embodiment, the epoxy compound, such as epichlorohydrin, may be initially at least partially reacted with a suitable dihydroxy organic compound such as Bisphenol-A, resorcinol, hydroquinone, glycol, glycerol or a di-(mono-hydroxy) alkane to produce an intermediate or prepolymer, which is then reacted with the silicoformic acid and hydrated silica mixture to produce epoxy silicoformate and silicate polymers.

Any suitable catalyst may be used to initiate, promote or modify the chemical reaction. Typical catalysts include various mineral acids, Lewis acids and organic amine compounds. Organic amines have been found to both act as a catalyst and enter into the reaction and become part of the epoxy silicoformate product. The amine may be primarily reacted with the silicoformic acid and hydrated silica mixture to form silicoformic amides and silicic amides, which are then reacted with the epoxy compounds. Aliphatic and aromatic amines have been found to be most useful. Primary amines are more effective than secondary and tertiary amines and are, therefore, preferred. Primary amines are the preferred catalyst. Optimum results have been obtained with polyfunctional aliphatic amines such as diethylene triamine, since the reaction takes place rapidly at room temperature and ambient pressure to form apparently highly cross-linked structures. If desired, complex or adduct amines may be used. Typical amines include methylamine, ethylamine, propylamine, isopropylamine, butylamine, amylamine, hexylamine, aniline, toluidine amine, xylidine amine, phenylenediamine, naphthylamine, benzylamine, ethylenediamine, tetramethylenediamine, pentamethylenediamine, hexamethylenediamine, octamethylenediamine, decamethylenediamine, xylylenediamine, piperazine and other compounds which end with an amine radical, such as aminocaproic acid, alkylene polyamines, vinyl amines, diethylenetriamine, triethylenetetramine, tetraethylenepentamine, tetramethylenediamine and mixtures thereof.

Any suitable modifying or additive compounds may be used in the reaction of this invention to vary the properties of the product. Typical additives include dicarboxylic anhydrides, polysulfide polymers, silico-aminoplasts, silicate aminoplasts, silico-phenoplasts, silicate phenoplasts, aminoplasts, phenoplasts, fatty acids, rosin acids, silico-furan polymers, silicate furan polymers, furfural-ketone resins, dibutyl phthalate, tricresyl phosphate, cresyl silicates, polyamides, fatty diamines, styrene oxide, acetonitrile, primary aromatic sulfonamides, secondary aromatic sulfonamides, disecondary sulfonamides, polymerized oils, carbon disulfide, soya bean oil, polyamide resins and mixtures thereof.

The reaction of this invention may take place under any suitable physical conditions. While many of the reactions will take place acceptably at ambient temperatures and pressure, in some cases, better results may be obtained at somewhat elevated temperatures and pressures. Preferably, the reaction takes place at a temperature between 50° C and the boiling point of the solution. On the other hand, where the reaction is exothermic, it may be desirable to cool the reaction vessel. With some products it is desirable to raise the pH after the reaction is complete to at least about 7, to precipitate the polymer.

While all the details of the reactions which take place are not fully understood, it appears that the silicoformic acid generally reacts with the epoxy radical of the epoxy compound. Epichlorohydrin is theorized to react with silicoformic acid as follows:

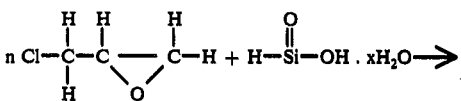

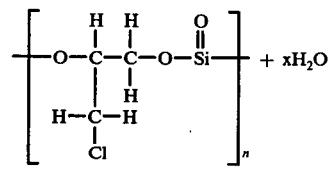

Epichlorohydrin is theorized to react with hydrated silica as follows:

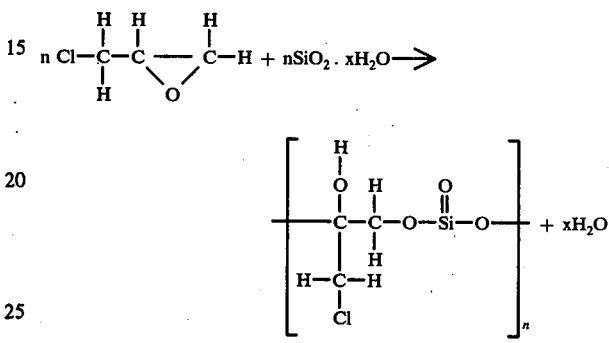

DESCRIPTION OF PREFERRED EMBODIMENTS

My invention will be illustrated in greater detail in the specific examples which follow, which detail preferred embodiments of my process. It should be understood that the scope of my invention is not limited to the specific processes set out in the examples. Parts and percentages are by weight, unless otherwise indicated.

EXAMPLE I

Dry granular sodium metasilicate is slowly added to concentrated sulfuric acid in the ratio of about 1 to 1 mols while agitating to keep the temperature below 100° C; oxygen evolves from the mixture and the reaction is complete in 2 to 4 hours, thereby producing a white granular silicoformic acid ($H.SiO.OH.xH_2O$) and hydrated silica ($SiO_2.xH_2O$) mixture and sodium sulfate. The mixture is then washed with water, filtered and air dried at 25° to 75° C.

About 2 parts by weight of the silicoformic acid and hydrated silica granules and about 3 parts by weight of epichlorohydrin are mixed in a pyrex glass reaction vessel, at ambient temperature and pressure, and are thoroughly mixed. About 0.2 parts by weight of a catalyst, concentrated sulfuric acid, is slowly added and mixed well. In about 3 minutes the mixture becomes warm, and the chemical reaction proceeds rapidly, producing considerable heat. The reaction is complete in about 10 to 15 minutes, thereby producing white granules of silicic epoxy polymer, and dichloroethyl ether. The dichloroethyl ether is filtered off. The white granules of epoxy silicoformate polymer and epoxy silicate polymer are found to be soluble in acetic acid, methyl alcohol and other organic compounds.

EXAMPLE II

Sodium metasilicate pentahydrate and sodium hydrogen sulfate are mixed in the ratio of 1 to 2 mols, oxygen evolves, considerable heat is produced and the chemical reaction is complete in 2 to 4 hours, thereby producing silicoformic acid, hydrated silica and sodium sulfate. The mixture is washed with water, filtered to remove the salt, and then the white granules of silicoformic acid and hydrated silica are air dried at 25° to 75° C.

About 2 parts by weight of silicoformic acid, and hydrated silica mixture, about 3 parts by weight of epichlorohydrin and about 0.1 part by weight of a catalyst, diethylenetriamine, are mixed and agitated for about 10 minutes until the chemical reaction becomes vigorous, producing considerable heat. The chemical reaction is complete in about 20 minutes, thereby producing a hard light yellow, silicic epoxy polymer.

The following examples utilize the silicoformic acid and hydrated silica mixture as produced in Examples 1 and 2.

EXAMPLE III

About 2 parts by weight of dry granular silicoformic acid and hydrated silica mixture and about 2 parts by weight of diethylene triamine are mixed; about 2 parts by weight of epichlorohydrin are gradually added in divided parts of about 0.5 parts each 5 minutes and agitated for about 20 minutes, keeping the temperature below 50° C, thereby producing an epoxy silicoformate and epoxy silicate prepolymer. After the 2 parts of epichlorohydrin are added, a thick, light yellow, liquid prepolymer is produced. The acid prepolymer is thermoplastic and may be poured into a mold, then heated to just above 50° C and produces a solid, yellow rubbery useful object from the silicic epoxy polymer.

EXAMPLE IV

About 20 parts by weight of a dry granular silicoformic acid and hydrated silica mixture, about 20 parts by weight of ethylene diamine and about 30 parts by weight of epichlorohydrin are mixed. The chemical reaction starts immediately and produces a soft, yellow silicic epoxy polymer. The soft, yellow polymer is then heated to about 120° C for about 20 minutes, thereby producing a hard, tough, silicic epoxy polymer. The hard, tough epoxy silicoformate and epoxy silicate polymer melts at about 140° C and may be molded into useful products.

EXAMPLE V

About 20 parts by weight of silicoformic acid and hydrated silica mixture, about 20 parts by weight of diethylenetriamine and 20 parts by weight of sodium hydroxide in 20 parts by weight of water are mixed and heated to about 90° C for about 15 minutes; then about 30 parts by weight of epichlorohydrin by weight are added to said mixture and agitated. The chemical reaction is complete in about 30 minutes, thereby producing light yellow, rubbery granules of silicic epoxy polymer.

EXAMPLE VI

About 20 parts by weight of silicoformic acid and hydrated silica mixture, about 20 parts by weight of hexamethylenediamine are mixed and heated to about 90° C while agitating for about 30 minutes, thereby producing hexamethylene diamine silicoformate and hexamethylene diamine silicate. About 30 parts by weight of epichlorohydrin are mixed with said mixture and heated to about 50° C while agitating for about 30 minutes, thereby producing a tan, liquid polymer, (silicic epoxy polymer). The said polymer is thermoplastic, and when heated to about 80° C it becomes a tan, rubbery polymer.

The said liquid silicic epoxy polymer may be poured into a mold of a useful object and heated to about 80° C for 10 to 30 minutes, thereby producing a tan, rubbery, useful object.

EXAMPLE VII 20 parts by weight of the dry granular silicoformic adic and hydrated silica mixture, about 10 parts by weight of Bisphenol-A epichlorohydrin resin, and about 30 parts by weight of epichlorohydrin are mixed then heated to about 40° C. The mixture expands to about 6 times its original volume and forms a soft, yellow, foamy silicic epoxy polymer.

EXAMPLE VIII

About 20 parts by weight of said dry granular silicoformate and hydrated silica mixture, about 1 part p-aminobenzoic acid and about 3 parts of epichlorohydrin by weight are mixed and heated to the boiling point of epichlorohydrin while agitating and gradually elevating the temperature to about 120° C for about 45 minutes, thereby producing a tan, hard polymer (silicic epoxy polymer). The said polymer may be melted and molded into useful objects.

EXAMPLE IX

About 40 parts by weight of granular silicoformic acid and hydrated silica mixture, about 10 parts by weight of ethylamine, and about 60 parts by weight of epichlorohydrin are mixed then heated to about the boiling point of epichlorohydrin while agitating for about 30 minutes, thereby producing silicic epoxy polymer.

EXAMPLE X

About 20 parts by weight of granular silicoformic acid and hydrated silica mixture, 20 parts by weight of ethanolamine and about 30 parts by weight of epichlorohydrin are mixed, then heated to the boiling point of epichlorohydrin while agitating for about 30 minutes, thereby producing a silicic epoxy polymer.

EXAMPLE XI

About 40 parts by weight of granular silicoformic acid and hydrated silica mixture, about 20 parts by weight of triethylenetetramine, and about 60 parts of epichlorohydrin by weight are mixed and agitated for about 25 minutes, thereby producing a light yellow silicic epoxy polymer.

EXAMPLE XII

About 20 parts by weight of dry granular silicoformic acid and hydrated silica mixture, about 20 parts by weight of caprolactam and about 30 parts by weight of epichlorohydrin are mixed, then heated to about 150° C for about 20 minutes, thereby producing silicic polymer. The solid polymer may be melted and molded into useful objects.

EXAMPLE XIII

About 20 parts by weight of dry granular silicoformic acid and hydrated silica mixture, about 10 parts by weight of amino undecanoic acid and about 30 parts by weight of epichlorohydrin are mixed, then heated to the boiling point of epichlorohydrin for about 10 minutes then heated to about 180° C for about another 25 minutes, thereby producing silicic epoxy polymer.

EXAMPLE XIV

About 20 parts by weight of dry granular silicoformic acid and hydrated silica mixture, about 10 parts by weight of polyamide resin (linoleic acid and diethylene triamine polymerized) and about 30 parts of epichlorohydrin are mixed, then heated to about 60° C while agitating for about 30 minutes, thereby producing a light yellow, silicic epoxy polymer.

EXAMPLE XV

About 20 parts by weight of dry granular silicoformic acid and hydrated silica mixture, about 3 parts by weight concentrated phosphoric acid and about 30 parts by weight of epichlorohydrin are mixed and agitated for about 10 minutes and a vigorous reaction takes place, producing considerable heat, thereby producing white granules of silicic epoxy polymer and dichloroethyl ether. The dichloroethyl ether is filtered off.

EXAMPLE XVI

About 20 parts by weight of dry granular silicoformic acid and hydrated silica mixture, about 10 parts by weight of tolylene diamine and 30 parts by weight of epichlorohydrin are mixed, then heated to the boiling point of epichlorohydrin while agitating for about 10 minutes, then heated at about 180° C for about another 30 minutes, thereby procuding a light tan silicic epoxy polymer.

EXAMPLE XVII

About 20 parts by weight of silicoformic acid and hydrated silica mixture, about 5 parts by weight of ethylenediamine and 20 parts by weight of sodium polysulfide are mixed, then about 30 parts by weight of epichlorohydrin are added in divided proportions of 10 to 20 weight percent while agitating for 10 to 20 minutes after each proportion is added, thereby producing a tough rubbery silicic epoxy polymer.

EXAMPLE XVIII

About 20 parts by weight of silicoformic acid and hydrated silica mixture, about 30 parts by weight of 3,4-epoxy ethyl benzene and about 1 part by weight of a catalyst, diethylenetriamine are mixed and agitated for about 20 minutes, thereby producing silicic epoxy polymer.

EXAMPLE XIX

About 30 parts by weight of silicoformic acid and hydrated silica mixture, about 20 parts by weight of 1,2-epoxy cyclohexane are mixed in a glass vessel, then about 3 parts by weight of a naphthylamine catalyst are added. The mixture is heated to about 60° C and agitated until the reaction is complete after about 30 minutes, thereby producing silicic epoxy polymer.

Although specific conditions and ingredients have been described in conjunction with the above Examples of preferred embodiments, these may be varied, and other reagents and additives may be used, where suitable, as described above, with similar results.

Other modifications and applications of this invention will occur to those skilled in the art upon reading this disclosure. These are intended to be included within the scope of this invention, as defined in the appended claims.

I claim:

1. The process for the production of silicic epoxy polymers by the following steps:
   (a) admixing 2 parts by weight of a silicoformic acid and hydrated silica mixture with 2 to 3 parts by weight of an organic epoxy compound having at least one epoxy group;
   (b) mixing therewith a catalytic amount of a catalyst selected from the group consisting of Lewis acids, organic amine compounds and polyamine resins;
   (c) agitating the mixture until the resulting chemical reaction is complete.

2. The process according to claim 1 wherein said organic epoxy compound is selected from the group consisting of epichlorohydrin, glycidol, methyl epichlorohydrin, 1,2-epoxy-3-phenoxypropane, 3,4-epoxyethyl benzene, 1,8-epoxy-p-menthane, 1,2-epoxybutane, 1,2-epoxycyclohexane, epoxyethane, 1,2-epoxypropane, 1-chloro-2,3 epoxypropane, 1:2,3:4-diepoxybutane, 2:3,6:7-diepoxy-2,6-dimethyl-4-octene, epoxyethylbenzene and mixtures thereof.

3. The process according to claim 1 wherein said organic epoxy compound comprises epichlorohydrin.

4. The process according to claim 1 wherein said catalyst is added to the silicoformic acid and hydrated silica mixture prior to the addition of said organic epoxy compound thereto, and said epoxy compound is added in steps of about 10 to 20 weight percent of the total epoxy compound while allowing the reaction following each addition to reach substantial completion before addition of the next step.

5. The process according to claim 1, including the further step of at least partially reacting said epoxy compound with a dihydroxy organic compound to produce a new epoxy compound prior to mixing of said epoxy compound with said silicoformic acid and hydrated silica mixture.

6. The process according to claim 1 wherein said catalyst is an organic amine selected from the group consisting of primary aliphatic and aromatic amines.

7. The process according to claim 1, including the further step of adding an alkali compound selected from the group consisting of sodium hydroxide, potassium hydroxide, sodium carbonate and potassium carbonate with the said organic amine in the proportion of one to two mols to each two mols of the halide present in the epoxy compound.

8. The process according to claim 1 wherein the mixture is maintained at a temperature between about 50° C and the boiling temperature of said mixture during the reaction period.

9. The process according to claim 1 wherein said silicoformic acid and hydrated silica mixture is first reacted with the amine catalyst consisting of a polyamine, selected from the group consisting of phenylenediamine, ethylenediamine, tetramethylenediamine, pentamethylenediamine, hexamethylenediamine, octamethylenediamine, decamethylenediamine, xylylenediamine, piperazine, alkylene polyamines, vinyl amines, diethylenetriamine, triethylenetriamine, tetraethylenepentamine, tetramethylenediamine, and mixtures thereof, by mixing the silicoformic acid and hydrated silica mixture with the amine compound, then heating the mixture to just below the boiling point of the amine compound for 20 to 40 minutes, thereby producing a silicic amine compound.

10. The process according to claim 1 wherein 2 parts by weight of silicoformic acid and hydrated silica mixture are mixed with about 2 to 3 parts by weight of an organic amine selected from the group consisting of primary aliphatic amines, and aromatic amines, then 2 to 3 parts by weight of epichlorohydrin are added in proportion of about 0.5 parts by weight while agitating until the chemical reaction is substantially complete.

11. The polymeric product produced by claim 1.

12. The polymeric product produced by claim 7.

13. The process according to claim 1 wherein the silicoformic acid and hydrated silica mixture is produced by the following steps:
   (a) adding dry granular sodium metasilicate to concentrated sulfuric acid while agitating to keep the temperature below 100° C and in the ratio of about 1:1 mols; thereby
   (b) producing a white granular mixture of silicoformic acid, hydrated silica and sodium sulfate;
   (c) washing with water and filtering to remove the sodium sulfate; thereby
   (d) recovering a white granular mixture of silicoformic acid and hydrated silica.

14. The process according to claim 1 including the further step of adding sodium polysulfide with the organic amine in the ratio of 2 parts by weight to 3 parts by weight of epichlorohydrin.

15. The polymeric product produced by claim 14.

* * * * *